United States Patent
Emery

(10) Patent No.: US 10,582,669 B2
(45) Date of Patent: Mar. 10, 2020

(54) SAP COLLECTING DEVICE

(71) Applicant: Kenneth L. Emery, East Dummerston, VT (US)

(72) Inventor: Kenneth L. Emery, East Dummerston, VT (US)

( * ) Notice: Subject to any disclaimer, the term of this patent is extended or adjusted under 35 U.S.C. 154(b) by 325 days.

(21) Appl. No.: 14/994,483

(22) Filed: Jan. 13, 2016

(65) Prior Publication Data

US 2016/0278309 A1  Sep. 29, 2016

Related U.S. Application Data

(60) Provisional application No. 62/138,720, filed on Mar. 26, 2015.

(51) Int. Cl.
*A01G 23/14* (2006.01)

(52) U.S. Cl.
CPC .................... *A01G 23/14* (2013.01)

(58) Field of Classification Search
CPC .................. A01G 23/10; A01G 23/14
USPC .......................................... 47/52
See application file for complete search history.

(56) References Cited

U.S. PATENT DOCUMENTS

| | | | |
|---|---|---|---|
| 74,101 A * | 2/1868 | Livermore | A01G 23/14 47/53 |
| 858,380 A * | 7/1907 | Gilmer | A01G 23/14 47/11 |
| 930,361 A * | 8/1909 | Drake | A01G 23/14 47/11 |
| 1,221,509 A * | 4/1917 | Chesley | A01G 23/14 47/11 |
| 1,718,195 A * | 6/1929 | Rankin | A01G 7/06 47/57.5 |
| 2,974,445 A * | 3/1961 | Vann | A01G 7/06 111/7.3 |
| 3,295,254 A * | 1/1967 | Schoonman | A01G 7/06 47/57.5 |
| 3,469,344 A * | 9/1969 | Garvey | A01G 23/10 137/268 |

(Continued)

FOREIGN PATENT DOCUMENTS

| | | | | |
|---|---|---|---|---|
| CA | 2810097 A1 * | 11/2013 | ............. | A01G 23/10 |
| CA | 2913761 A1 * | 6/2016 | ............. | A01G 23/14 |

(Continued)

*Primary Examiner* — Magdalena Topolski
*Assistant Examiner* — Morgan T Barlow
(74) *Attorney, Agent, or Firm* — Boudwin Intellectual Property

(57) ABSTRACT

A sap collecting device for harvesting sap from a tree while minimizing damage to the tree. The sap collecting device includes a housing having a hollow interior volume, a first end, and a second end, wherein the first end includes an opening thereon. The first end can be placed flush against a portion of a tree having a small hole drilled therein. The housing is secured to the tree via a fastener that extends through the housing from the second end thereof. The first end further includes a gasket thereon for producing a fluid tight seal. A spout extends outward from the housing and includes an open end such that sap that flows into the housing can exit via the spout. The spout has one or more ridges on the exterior thereof so that a vacuum hose of a vacuum system can be connected to the spout.

5 Claims, 2 Drawing Sheets

(56) References Cited

U.S. PATENT DOCUMENTS

| | | | | | |
|---|---|---|---|---|---|
| 3,596,402 | A | * | 8/1971 | Palmer | A01G 23/14 222/81 |
| 3,834,075 | A | * | 9/1974 | Nix | A01G 7/06 47/57.5 |
| 3,968,594 | A | * | 7/1976 | Kawakami | A01G 7/06 47/57.5 |
| 4,195,440 | A | * | 4/1980 | Rodrigue | A01G 23/10 417/460 |
| 4,299,053 | A | * | 11/1981 | Foote | A01G 23/14 47/52 |
| 4,512,104 | A | | 4/1985 | Lamb | |
| 4,884,365 | A | * | 12/1989 | Lesquir | A01G 23/14 47/52 |
| 4,887,387 | A | * | 12/1989 | Lesquir | A01G 23/14 47/52 |
| 4,908,983 | A | * | 3/1990 | Mazur | A01G 7/06 47/57.5 |
| 4,926,597 | A | * | 5/1990 | Landry | A01G 23/14 239/272 |
| 5,355,619 | A | * | 10/1994 | West | A01G 7/06 47/48.5 |
| 5,355,620 | A | * | 10/1994 | Newbanks | A01G 7/06 47/57.5 |
| 5,596,837 | A | * | 1/1997 | Duff | A01G 7/06 47/57.5 |
| 5,956,894 | A | * | 9/1999 | Eldridge | A01G 7/06 47/57.5 |
| 8,539,712 | B2 | | 9/2013 | Perkins | |
| 8,677,682 | B2 | | 3/2014 | Coté et al. | |
| 9,435,476 | B2 | * | 9/2016 | Vachon | A01G 23/14 |
| 2002/0014037 | A1 | | 2/2002 | Dumas | |
| 2005/0000153 | A1 | * | 1/2005 | White | A01G 23/14 47/11 |
| 2011/0173880 | A1 | * | 7/2011 | Perkins | A01G 23/14 47/52 |
| 2015/0040472 | A1 | * | 2/2015 | Perkins | A01G 23/10 47/50 |
| 2015/0377399 | A1 | * | 12/2015 | Vachon | F16L 41/12 285/197 |

FOREIGN PATENT DOCUMENTS

| | | | | | |
|---|---|---|---|---|---|
| FR | 655733 | A | * | 4/1929 | A01G 23/14 |
| FR | 690569 | A | * | 9/1930 | A01G 23/14 |
| FR | 1044498 | A | * | 11/1953 | A01G 7/06 |

* cited by examiner

SAP COLLECTING DEVICE

CROSS REFERENCE TO RELATED APPLICATION

This application claims the benefit of U.S. Provisional Application No. 62/138,720 filed on Mar. 26, 2015. The above identified patent application is herein incorporated by reference in its entirety to provide continuity of disclosure.

BACKGROUND OF THE INVENTION

Field of the Invention

The present invention relates to collection devices. More specifically, the present invention provides a sap collecting device for facilitating harvesting sap from a tree. The sap collecting device comprises a housing having a first end with an opening thereon to be placed against a portion of a tree having a small hole drilled therein. The sap collecting device further comprises a spout through which the sap can flow into a collection vessel.

Sap is often harvested from trees for various commercial uses. Sap is generally collected by drilling a hole deep into the trunk of the tree in order to obtain sap. The sap can then be allowed to drain from the hole and into a collection vessel. Alternatively, a tap can be inserted into the hole to better direct and channel the sap into a collection vessel.

However, drilling a hole into a tree is harmful to the tree. The hole may put the tree at greater risk of being infested by insects and becoming diseased. Further, the larger the hole, the longer it will take the tree to repair or heal the hole. Thus, it is desirable to obtain sap with the smallest hole possible in order to avoid damaging the tree. Further, waiting for sap to flow from the tree via gravity can be slow and time consuming. Thus, an improved sap collection device suitable for use with a vacuum system is desired.

Devices have been disclosed in the prior art that relate to sap collecting devices. These include devices that have been patented and published in patent application publications. These devices generally relate to sap collecting devices that can be inserted into a tree and that include compact configurations so as to minimize damage to a tree, such as U.S. Published Patent Application Number 2005/0000153, U.S. Pat. Nos. 8,677,682, 4,512,104, 8,539,712, and U.S. Published Patent Application Number 2002/0014037.

These prior art devices have several known drawbacks. The sap collecting devices in the prior art include portions that must be inserted deep within a tree in order to support the sap collection device and in order to access the tree sap. As a result, the tree may require substantial time to heal from the insertion of the sap collection device and the tree is at increased risk of infestation. Further, the sap collecting devices in the prior art are not suitable for use with a vacuum system that would allow for more rapid collection of sap. Thus, the present invention provides a sap collection device that results in minimal damage to the tree and that is suitable for use with a vacuum system.

In light of the devices disclosed in the prior art, it is submitted that the present invention substantially diverges in design elements from the prior art and consequently it is clear that there is a need in the art for an improvement to existing sap collecting devices. In this regard the instant invention substantially fulfills these needs.

SUMMARY OF THE INVENTION

In view of the foregoing disadvantages inherent in the known types of sap collecting devices now present in the prior art, the present invention provides a new sap collecting device wherein the same can be utilized for providing convenience for the user when collecting sap from a tree while minimizing damage to the tree.

It is therefore an object of the present invention to provide a new and improved sap collecting device comprising a housing with a hollow interior volume and an open end that is adapted to be placed against a tree, wherein the housing includes a spout thereon through which sap can flow.

It is another object of the present invention to provide a sap collecting device comprising a housing having an open end with a gasket thereon so as to create a seal around the opening on the housing.

Another object of the present invention is to provide a sap collecting device having a spout with ridges so that it can receive a vacuum hose thereon.

Yet another object of the present invention is to provide a sap collecting device having a threaded fastener for securing the housing to a tree in order to collect sap therefrom.

Another object of the present invention is to provide a sap collecting device that may be readily fabricated from materials that permit relative economy and are commensurate with durability.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
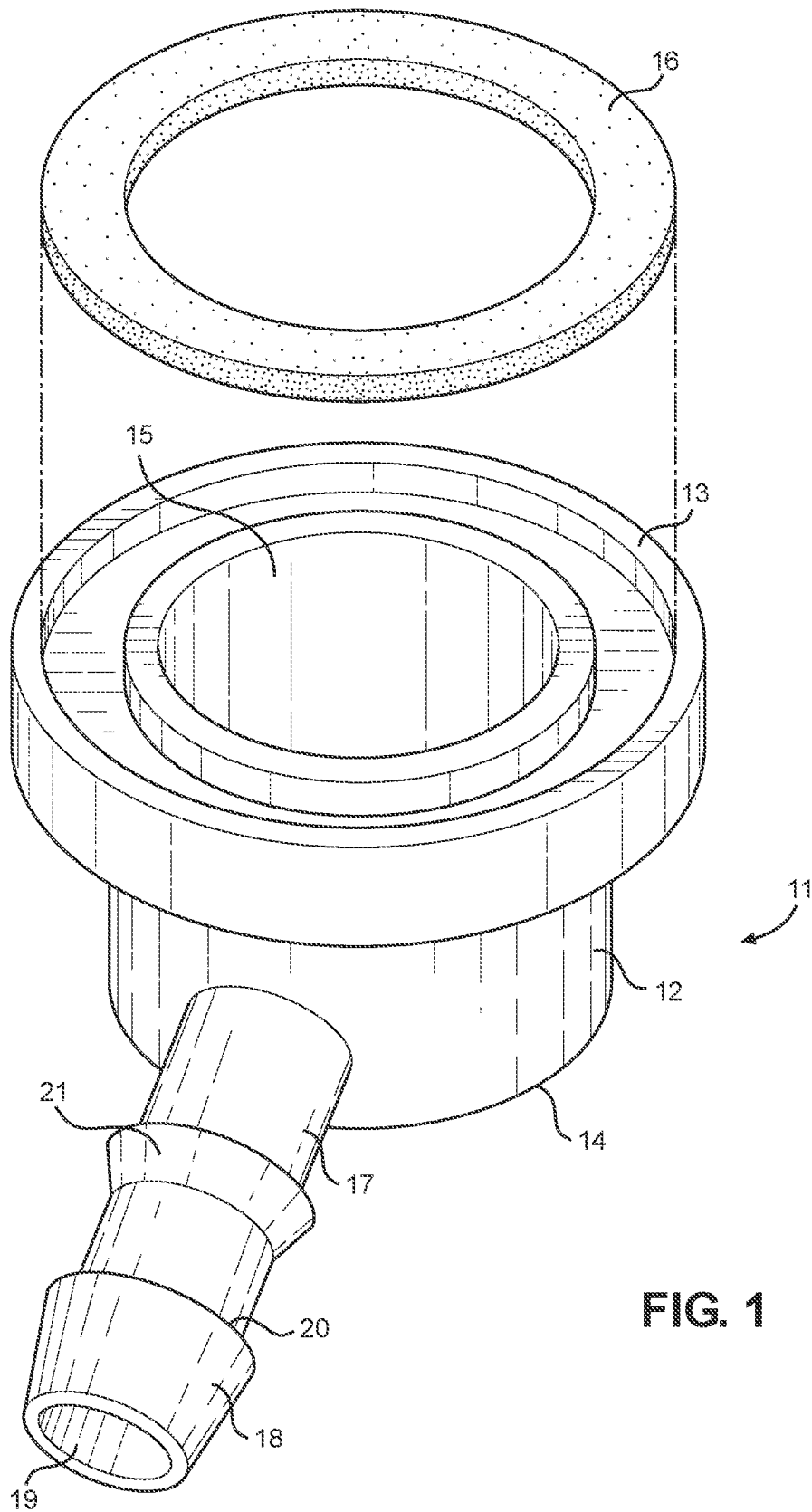
FIG. 1 shows a perspective view of the sap collecting device.

Reference is made herein to the attached drawings. Like reference numerals are used throughout the drawings to depict like or similar elements of the sap collecting device. For the purposes of presenting a brief and clear description of the present invention, the preferred embodiment will be discussed as used for collecting sap from a tree. The figures are intended for representative purposes only and should not be considered to be limiting in any respect.

Referring now to FIG. 1, there is shown a perspective view of the sap collecting device. The sap collecting device 11 comprises a housing 12 having a first end 13 and a second end 14. The housing 12 is shown as having a cylindrical configuration, however, in alternate embodiments, the housing 12 can have various other configurations. The first end 13 of the housing 12 comprises an opening 15 thereon providing access to the hollow interior volume of the housing 12. The first end 13 is substantially planar or flat so that the first end 13 can be placed flush against an exposed portion of a tree having a hole drilled therein.

The first end 13 further includes a gasket 16 thereon, wherein the gasket 16 creates a seal about the opening 15. The seal is preferably airtight so that the sap collecting device 11 can be used with a vacuum system to draw sap from the tree, and the seal also helps to prevent sap from flowing around or escaping from the housing 12. The gasket 16 comprises a ring shape and is positioned around the opening 15. The gasket 16 is composed of rubber, silicone, or other similar material that helps to create a seal between the housing 12 and the tree.

The sap collecting device 11 further includes a spout 17 that extends outward from the housing 12. The spout 17 comprises a hollow interior volume and is in fluid communication with the housing 12. In this way, sap can flow into the first end 13 of the housing 12, through the spout 17, and can escape from the opening 19 on the end 18 of the spout 17. The spout 17 is shown as having a substantially cylindrical configuration, however, in alternate embodiments, the spout 17 can have various other configurations.

The spout 17 preferably includes one or more ridges 20, 21 along the exterior thereof. The ridges 20, 21 allow a user to secure a vacuum hose onto the spout 17, wherein the ridges 20, 21 help to ensure that the vacuum tube creates a seal and remains in position over the spout 17. In this way, the user can affix a vacuum system to the sap collecting device 11 so that sap can be more forcefully and rapidly withdrawn from the tree.

Figure 2:
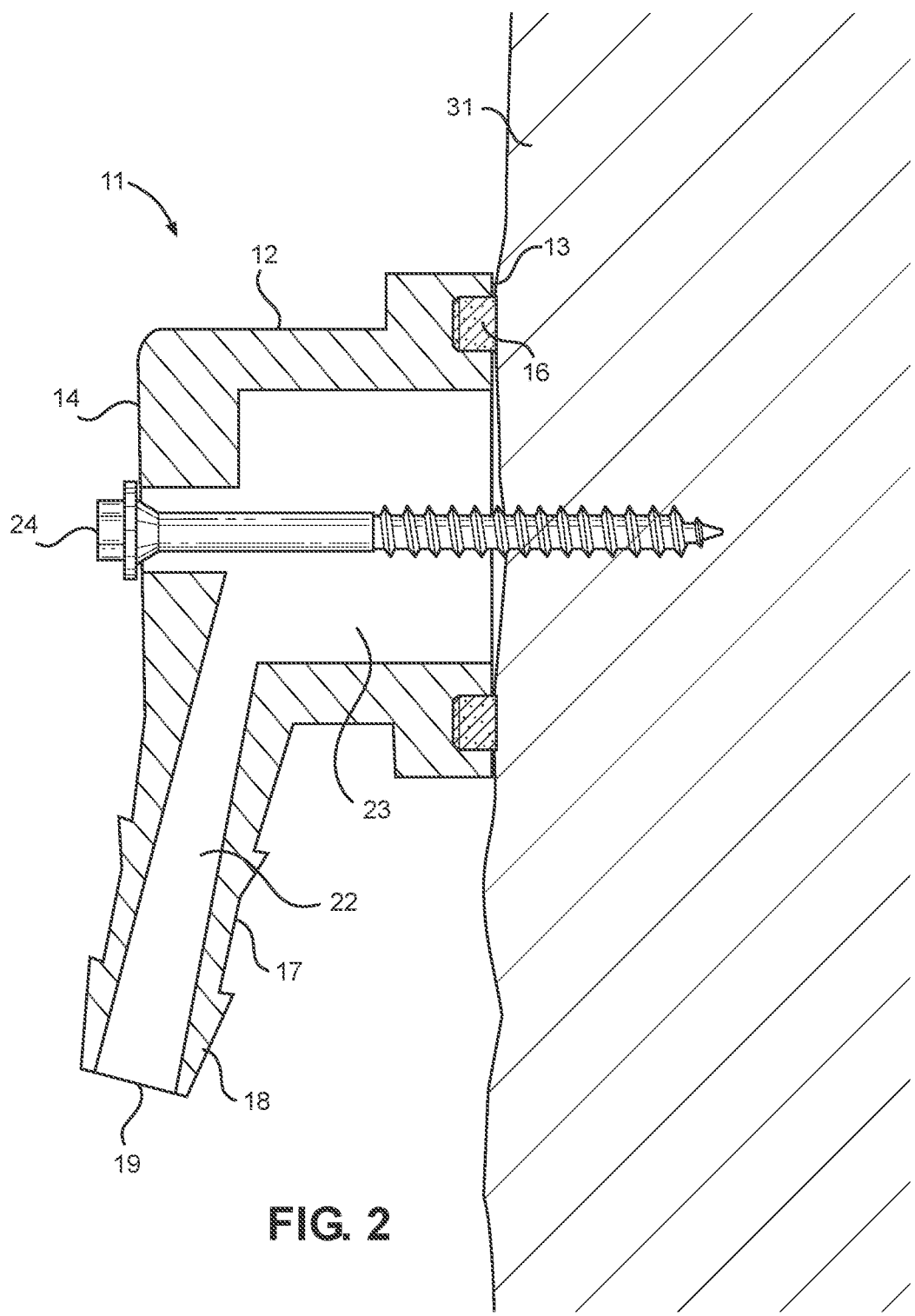
FIG. 2 shows a cross sectional view of the sap collecting device in use.

Referring now to FIG. 2, there is shown a cross sectional view of the sap collecting device. In operation, a portion of the tree 31 can be chopped or cut so as to reveal a flat section suitable to receive the sap collecting device 11 thereon. The first end 13 of the sap collecting device 11 is adapted to be placed flush against a flat section of a tree 31. The first end 13 includes a gasket that creates an airtight seal.

The housing 12 is secured onto the tree 31 via a fastener 24 that extends from the second end 14 of the housing 12 and passes through the interior volume 23 thereof, wherein the fastener 24 extends into the tree 31. The fastener 24 preferably comprises threading thereon, such as a screw. In alternate embodiments, one or more fasteners can be used to secure the housing 12 to the tree 31. The fastener 24 creates a seal with the housing 12 so that no air or sap can escape from the area or space around the fastener 24.

As sap flows from the tree into the housing 12, the sap can escape the housing 12 by flowing through the spout 17 thereon. The spout 17 comprises a hollow interior volume 22 and extends outward and downward from the housing 12. The spout 17 includes an open end 19 so that sap can flow from the tree into the housing 12, through the spout 17, and can exit via the opening 19 on the end 18 thereof under gravitational forces. A collection device can be placed at the open end of the spout so that the sap can be easily collected.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A sap collecting device, consisting of:
   a housing having a hollow interior volume, a first end, and a second end;
   an opening on said first end, wherein said first end is configured to be placed flush against a portion of a tree;
   a fastener extending through said second end and configured to be inserted into said tree so as to secure said housing to said tree;
   a spout extending from said housing, wherein said spout includes an open end through which sap can flow;
   one or more ridges on an exterior of said spout, wherein said ridges are configured to allow a vacuum tube to be secured onto said spout;
   wherein said first end of said housing further includes a gasket thereon configured to allow an airtight seal with said tree;
   wherein said gasket is removably disposed in an annular channel defined by said first end of said housing;
   wherein said fastener comprises threading thereon.

2. The sap collecting device of claim 1, wherein said spout comprises a cylindrical configuration.

3. The sap collecting device of claim 1, wherein said first end of said housing is flat.

4. The sap collecting device of claim 1, wherein an interior angle between the spout and the housing is greater than 90 degrees.

5. The sap collecting device of claim 1, wherein a tree-contacting end of the fastener extends beyond an outermost end of the first end.

* * * * *